Nov. 4, 1952  G. GROSSE  2,616,649
SUPPORT FOR REARVIEW MIRRORS
Filed Aug. 30, 1950
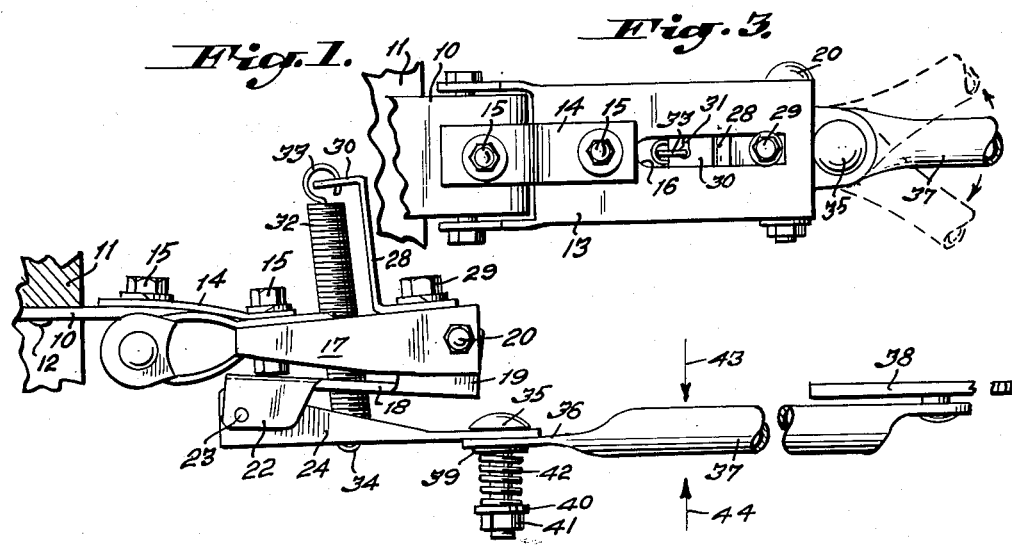
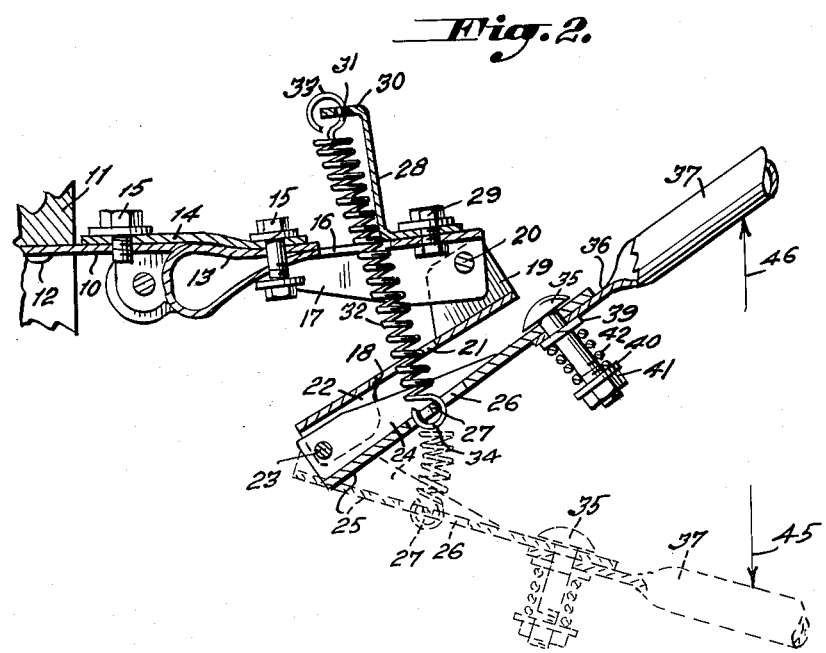
INVENTOR.
George Grosse
BY
Patrick D. Beavers
Attorney.

Patented Nov. 4, 1952

2,616,649

UNITED STATES PATENT OFFICE 2,616,649

SUPPORT FOR REARVIEW MIRRORS

George Grosse, Wolf Point, Mont.

Application August 30, 1950, Serial No. 182,327

3 Claims. (Cl. 248—282)

The present invention relates to a support for rear view mirrors and it consists in the combinations, constructions and arrangements of parts herein described and claimed.

Generally the invention comprises a support for a rear view mirror and particularly those mounted upon truck tractors or the like, the latter usually protruding for a considerable distance outwardly of the cab of such tractor thus causing the same to be always in a position whereby they may be damaged by the sides of doors, adjacent trucks and the like. Provision is made in the device embodying the present invention whereby the same may be bent forwardly or rearwardly without damage, the same being provided with shock absorbing means and means for returning the same to its normal position.

It is accordingly an object of the invention to provide a device of the character set forth which is simple in construction, inexpensive to manufacture and yet effective and efficient in use.

Another object of the invention is the provision, in a device of the character set forth of novel yieldable self-aligning shock absorbers.

Other and further objects of the invention will become apparent from a reading of the following specification taken in conjunction with the drawing, in which:

Figure 1 is a fragmentary plan view of an embodiment of the invention,

Figure 2 is a view similar to Figure 1, partly in section, but illustrating how the device may be bent prior to automatically returning to the position shown in Figure 1 which is the normal position of the device, and Figure 3 is a fragmentary reduced elevational view of the device shown in Figures 1 and 2.

Referring more particularly to the drawing, there is shown therein a laterally extending bracket 10 which is affixed to a truck 11 or the like by means of metal screws 12 or the like. To the bracket is affixed a base plate 13 by means of a metal strap 14 and bolts or screws 15.

The plate 13 extends laterally outwardly and is provided with a centrally disposed longitudinally extending slot 16 and with rearwardly extending integrally formed ears 17.

An intermediate plate 18 is provided at its outer end with a pair of forwardly extending ears 19 which are interconnected pivotally with the forward ends of the ears 17 by means of a vertically extending shaft 20. The plate 18 is likewise provided with a centrally disposed longitudinally extending slot 21.

The plate 18 is provided at its inner end with a pair of rearwardly extending ears 22 which are connected by means of a vertically extending shaft 23 with forwardly extending ears 24 of a support plate 25, the ears 24 being connected with the ears 22 at the inner ends of the ears 24.

An opening 26 is centrally provided in the support plate 25 and has extending thereacross a bar 27. A forwardly extending bracket 28 is affixed to the outer end of the base plate 13 by means of a bolt 29, or the like and is provided with an integrally formed inwardly directed foot 30 at its outer end which foot is provided with opening 31. A tension spring 32 extends through the openings 16 and 21 and is provided with eyes 33 and 34 at its opposite ends. The eye 33 is engaged with the brackets 28 by passing the same through the opening 31 while the eye 34 is engaged over the bar 27 in the opening 26.

A bolt 35 extends rearwardly through the outer end of the support plate 25 and has vertically pivotally mounted thereon the inner end 36 of a mirror support arm 37 upon the outer end of which is affixed a mirror 38. Outwardly of the end 36 a washer 39 is mounted upon the bolt 35 and a second washer 40 abuts a nut 41 threaded upon the outer end of the bolt 35. A compression spring 42 surrounds the bolt 35 and bears against the washers 39 and 40 to maintain the arm 37 in preselected positions.

In operation, it will be apparent that if the arm 37 or mirror 38 impinges against an object such as the side of a door or an adjacent truck or automobile that the same will not be broken by such contact but that should such object come into contact therewith in the direction of the arrow 43 in Figure 1 of the drawing, the plate 25 will move in the direction of the arrow 45 in Figure 2 of the drawing while the intermediate plate 18 will remain in position and thereafter when no further pressure is being applied to the device in the direction of the arrows 43 and 45, the spring 32 will act to retract the device to its normal position shown in Figure 1.

Again, if an object is encountered in the direction of the arrow 44 in Figure 1 the arm 37 and the plate 25 will be bent in the direction of the arrow 46 in Figure 1 and to the position of the device shown therein. In this case the arms 25 and 18 will move as a unit upon the pivot 20 against the action of the spring 32 which will act, after such object has been passed, to return the device again to its normal position shown in Figure 1. Thus it will be seen that the device not only acts as a shock absorber but that it will prevent breakage of the ordinary supporting means for a mirror such as is shown at 38 due to the fact that the plate 25 will yield in one direction while the plates 18 and 25 will yield in the other direction when objects are encountered by either the mirror or its supporting arm 37.

While but one form of the invention has been shown and described herein, it will be readily apparent to those skilled in the art that many minor modifications may be made without departing from the spirit of the invention or the scope of the appended claims.

What is claimed is:

1. A device of the character described comprising a laterally extending bracket adapted to be attached to the body of a vehicle, a base plate affixed to and extending outwardly from said bracket, an intermediate plate pivoted at its outer end to the outer end of said base plate, a support plate pivoted at its inner end to the inner end of the intermediate plate, and yieldable means for normally holding said plates in substantially parallel condition to one another, said means including a tension spring attached at one end to the base plate and at its other end to said support plate and extending through said intermediate plate.

2. A device of the character described comprising a laterally extending bracket adapted to be attached to the body of a vehicle, a base plate affixed to and extending outwardly from said bracket, an intermediate plate pivoted at its outer end to the outer end of said base plate, a support plate pivoted at its inner end to the inner end of the intermediate plate, yieldable means for normally holding said plates in substantially parallel condition to one another, a mirror support arm pivoted to the outer end of said support plate and means for vertically adjusting said arm with respect to said support plate.

3. A device of the character described comprising a laterally extending bracket adapted to be attached to the body of a vehicle, a base plate affixed to and extending outwardly from said bracket, an intermediate plate pivoted at its outer end to the outer end of said base plate, a support plate pivoted at its inner end to the inner end of the intermediate plate, and yieldable means for normally holding said plates in substantially parallel condition to one another, said means including a tension spring attached at one end to the base plate and at its other end to said support plate and extending through said intermediate plate, a mirror support arm pivoted to the outer end of said support plate, and means for vertically adjusting said arm with respect to said support plate.

GEORGE GROSSE.

REFERENCES CITED

The following references are of record in the file of this patent:

UNITED STATES PATENTS

| Number | Name | Date |
| --- | --- | --- |
| 1,440,043 | Wright | Dec. 26, 1922 |
| 2,424,222 | Brown et al. | July 22, 1947 |
| 2,556,976 | Oetzel | June 12, 1951 |